(12) United States Patent
Cifers et al.

(10) Patent No.: US 12,158,179 B1
(45) Date of Patent: Dec. 3, 2024

(54) BALL MOUNT AND ACCESSORY MOUNTING TRACK AND TEE-BOLT FOR USE THEREWITH

(71) Applicant: YakAttack LLC, Farmville, VA (US)

(72) Inventors: Luther Cifers, Farmville, VA (US); Daniel Anderson Newman, Salem, VA (US)

(73) Assignee: YakAttack LLC, Farmville, VA (US)

( * ) Notice: Subject to any disclaimer, the term of this patent is extended or adjusted under 35 U.S.C. 154(b) by 56 days.

(21) Appl. No.: 17/533,951

(22) Filed: Nov. 23, 2021

Related U.S. Application Data

(60) Provisional application No. 63/117,042, filed on Nov. 23, 2020.

(51) Int. Cl.
F16C 11/06 (2006.01)

(52) U.S. Cl.
CPC ...... F16C 11/0695 (2013.01); F16C 11/0604 (2013.01)

(58) Field of Classification Search
CPC ............. F16C 11/0695; F16C 11/0609; F16C 11/0604; F16M 11/14; F16M 11/2085; F16M 11/043; F16M 13/02; F16M 13/022
See application file for complete search history.

(56) References Cited

U.S. PATENT DOCUMENTS

| | | | | |
|---|---|---|---|---|
| 1,547,463 A * | 7/1925 | Styan | ...................... | G05G 1/06 16/DIG. 30 |
| 4,230,336 A * | 10/1980 | Avrea | ..................... | B60D 1/065 411/910 |
| 4,334,795 A * | 6/1982 | Westphal | ................. | B62D 7/18 403/140 |
| 4,522,421 A * | 6/1985 | Vance | ...................... | B60D 1/52 280/511 |
| 5,071,279 A * | 12/1991 | Rutstrom | ............... | F16M 11/14 403/114 |
| 5,280,941 A * | 1/1994 | Guhlin | ..................... | B60D 1/60 411/910 |
| 6,715,781 B1 * | 4/2004 | Smith | ...................... | B60D 1/06 280/511 |
| 8,038,162 B2 * | 10/2011 | Knopp | .................. | F16C 11/106 403/77 |
| 8,647,009 B2 * | 2/2014 | Kobayashi | .............. | F24S 25/61 52/173.3 |
| 9,671,060 B1 * | 6/2017 | Cifers | ................ | F16M 11/2085 |
| 9,828,073 B1 * | 11/2017 | Cifers, III | ............. | F16M 13/02 |
| 9,863,576 B1 * | 1/2018 | Cifers | ............... | F16M 11/2085 |
| 10,563,813 B1 * | 2/2020 | Cifers | ............... | F16M 11/2085 |
| 10,703,303 B2 * | 7/2020 | Hemphill | ........... | B62D 33/0273 |
| 10,967,939 B1 * | 4/2021 | Cifers, III | ............. | F16M 13/02 |
| 10,982,807 B2 * | 4/2021 | Carnevali | ............. | A47G 29/00 |
| 11,085,579 B2 * | 8/2021 | Carnevali | ............. | F16M 13/02 |
| 2007/0031185 A1 * | 2/2007 | Bertram | ............. | F16C 11/0657 403/122 |
| 2007/0166100 A1 * | 7/2007 | Congdon | ................. | B25G 3/30 15/159.1 |

(Continued)

*Primary Examiner* — Daniel J Wiley

(74) *Attorney, Agent, or Firm* — Thedford I. Hitaffer; Hitaffer & Hitaffer. PLLC

(57) ABSTRACT

A ball mount comprises a rigid insert extended through a region of the ball mount traversing an intersection of a ball and a neck portion to reinforce and strengthen the area of intersection. A rigid insert can be threaded to allow for mechanical attachment of the ball mount to a supporting surface.

25 Claims, 4 Drawing Sheets

(56) References Cited

U.S. PATENT DOCUMENTS

| | | | |
|---|---|---|---|
| 2011/0020055 A1* | 1/2011 | Kallas | H04R 1/08 403/115 |
| 2011/0268495 A1* | 11/2011 | Heide | F16B 31/06 403/299 |
| 2012/0045276 A1* | 2/2012 | Carnevali | F16B 7/20 403/350 |
| 2015/0030386 A1* | 1/2015 | Carnevali | F16B 7/187 403/348 |
| 2018/0322852 A1* | 11/2018 | Navarro | G10D 13/12 |
| 2018/0347749 A1* | 12/2018 | Carnevali | F16M 11/043 |
| 2018/0363842 A1* | 12/2018 | Carnevali | F16B 37/045 |
| 2019/0039519 A1* | 2/2019 | Blakeman | F16M 11/2078 |

* cited by examiner

BALL MOUNT AND ACCESSORY MOUNTING TRACK AND TEE-BOLT FOR USE THEREWITH

CROSS-REFERENCE TO RELATED APPLICATIONS

This application claims the benefit of U.S. Provisional Application No. 63/117,042, filed Nov. 23, 2021, the disclosure of which is incorporated herein by reference in its entirety.

BACKGROUND OF THE INVENTION

This invention relates in general to joints and connections, and more particularly, to articulated members that are lockable at a fixed position at a selected angle, such as a ball of a ball and socket joint or connection.

Ball and socket joints are useful in many different applications, such as for supporting cameras, fishing rod holders, lanterns and other recreational sports equipment, in relation to vehicles, including but not limited to kayaks. Such joints also have uses in other applications, such as on other vehicles, including, bicycles, motorcycles, all-terrain vehicles, pickup trucks, sport utility vehicles, maritime vessels and the like, for supporting a host of devices in relation to the vehicle, and/or for use in supporting various accessories or devices in relation to a user, such as on a helmet, a torso strap or the like.

The ball of a ball and socket joint is typically referred to as a ball mount. Ball mounts typically include a portion that is mostly or principally spherical (i.e., a spherical portion) supported by or in relation to a stem that is usually cylindrical. The stem typically extends generally along an axis extending radially from a center point of the spherical portion and terminates in a mounting portion, often referred to as a foot. The foot and stem typically have a central hole used to communicate with threaded mounting hardware, such as tee-bolt, when mounted in an adjustable relationship to a track, which, in turn, may be mounted in relation to a vehicle. The spherical portion is typically formed of an elastomer that allows a clamp to compress it, upon fixing the clamp in relation to the spherical portion. A plastic resin is typically used to form a base for the ball mount, and which forms a foundation for the spherical portion, including a neck and the foot of the stem. The central hole passing centrally through the foot and the neck can be threaded directly in the plastic resin or can support a threaded metal insert, which may be used to allow a threaded member to attach the ball mount securely to a supporting surface.

A problem associated with a conventional ball mount is that a clamp for use therewith can apply enough force to exceed the yield strength of the ball mount where the spherical portion intersects the neck of the stem. This area is naturally the point of stress concentration when a load is applied to the ball mount through a clamping member. The plastic is stressed until failure and the ball mount breaks where the neck interfaces with the spherical portion of the ball mount. The failure results in the inability to retain the ball, clamp and accessory or device attached by the clamp. This can result in the loss of expensive accessories or devices, especially when used on boats or open framed vehicles, such as all-terrain vehicles or motorcycles.

SUMMARY OF THE INVENTION

This invention relates to a ball mount and a rigid elongate insert that extends through a region of the ball mount traversing an intersection of a ball and a neck portion to reinforce and strengthen an area of the intersection. A rigid insert can be threaded to allow for mechanical attachment of the ball mount to a supporting surface. The insert can be held in place by protrusions extending into material (e.g., plastic) surrounding the insert.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
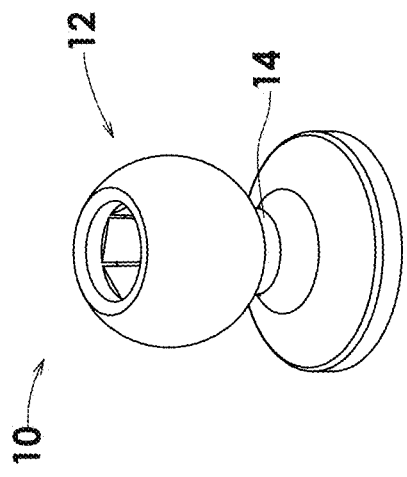
FIG. 1 is a perspective view of a ball mount according to an exemplary embodiment of the invention.

Referring now to the drawings, there is illustrated in FIG. 1 a ball mount 10 for use in a ball and socket joint. The ball mount 10 comprises a first portion in the form of a ball 12 that is configured to cooperate with a socket of the ball and socket joint. The ball mount 10 comprises a second portion in the form of a stem 14 that is supported in relation to the ball 12. The stem 14 is configured to support the ball 12 in relation to a supporting surface, such as a surface of a vehicle or vessel.

Figure 2:
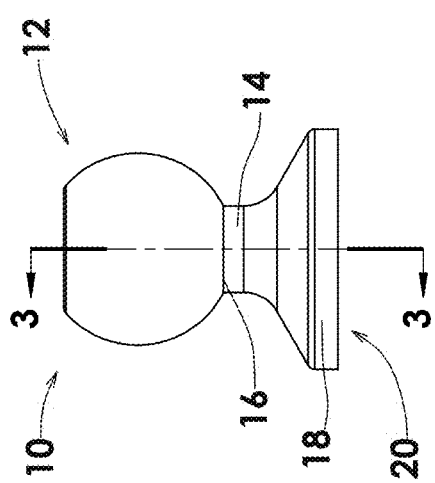
FIG. 2 is a side elevational view of the ball mount shown in FIG. 1.

As shown in FIG. 2, the ball 12 is preferably spherical or generally spherical. The stem 14 is preferably cylindrical or generally cylindrical. It is conceivable that the ball 12 and/or stem 14 may be of some other suitable shape. The stem 14 preferably extends radially or generally radially from the ball 12 or along an axis that extends radially or generally radially from a center point of the ball 12. The stem 14 may intersect the ball 12 at a neck 16 (e.g., a point or an area of transition between the ball 12 and the stem 14), which may be a point or an area of the ball mount 10 that is of highest stress concentration. The stem 14 may transition from the neck 16 to a foot 18, which may provide a relatively wide base (generally indicated at 20) for the ball mount 10, which may be used to provide stability to the ball mount 10 in relation to the supporting surface. The foot 18 may provide a solid foundation for the ball mount 10. It should be appreciated that the base 20 may be formed by the foot 18, or a portion thereof, together with a lower portion of the stem 14.

Figure 4:
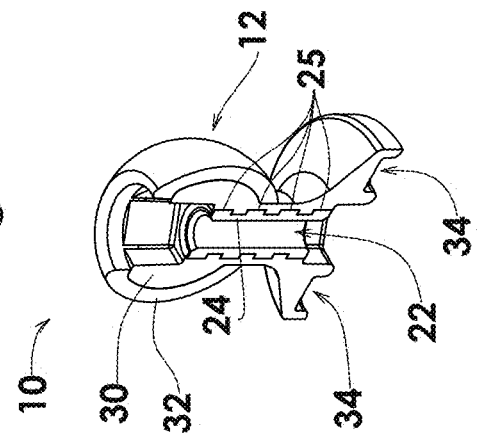
FIG. 4 is a cutaway perspective view of the ball mount.
Figure 3:
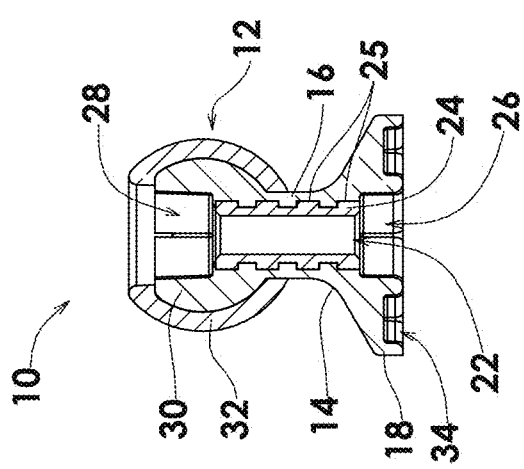
FIG. 3 is a cross-sectional view of the ball mount taken along the line 3-3 in FIG. 2.
Figure 5:
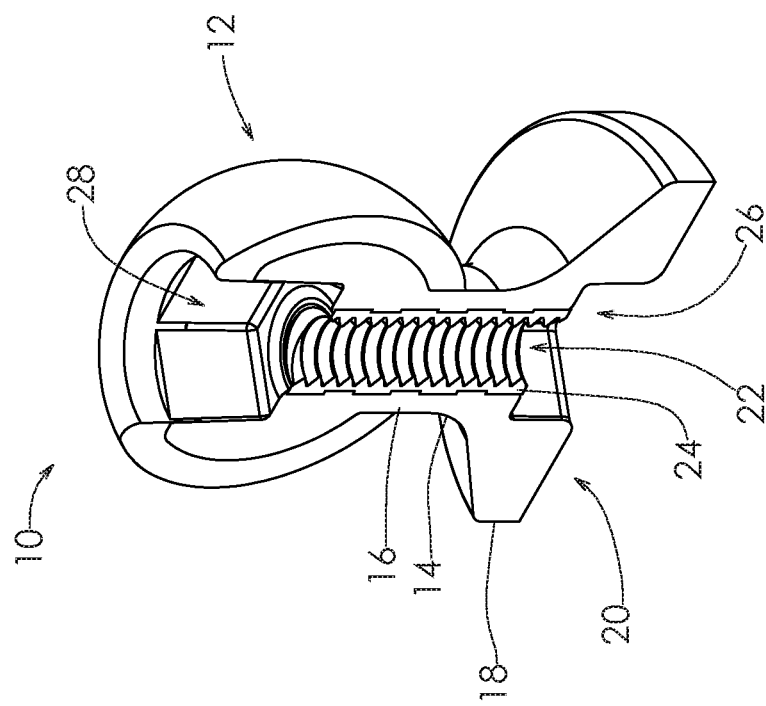
FIG. 5 is an enlarged cutaway perspective view of the ball mount.

Now, with reference to FIGS. 3-5, the ball mount 10 comprises an insert 24, which may be centrally located or otherwise located in relation thereto. The insert 24 may pass through the foot 18, stem 14 and neck 16 and enter into the ball 12, and depending on the configuration, may pass through the ball 12, as will become apparent in the description that follows. The insert 24 is preferably rigid, such as for example, metal, although it is conceivable that the insert 24 may be formed of some other suitable material. In any event, the insert 24 is structured to reinforce the ball mount 10, as will be described in more detail hereinbelow.

As clearly illustrated in the drawing figures, the insert 24 may extend through a region of the ball mount 10 traversing an intersection of the ball 12 and the neck 16 to reinforce and strengthen the area or intersection of the ball 12 and the neck 16. The insert 24 may be provided with a hole 22, which may be threaded to cooperate with threaded mounting hardware or non-threaded to provide for a mounting function that can be accomplished by other means unrelated to threaded mounting hardware (e.g., without the need for a threaded insert). The insert 24, when threaded, may cooperate with mounting hardware in the form of a threaded fastener to allow for mechanical attachment of the ball mount 10 to the supporting surface.

The insert 24 may be provided with protrusions (e.g., castellations, or changes in an outer surface of the insert 24, including a generally irregular shaped outer surface), which may cooperate with the ball 12, stem 14, neck 16 and/or foot 18 to retain the insert 24 therein. In the illustrated embodiment, the outer surface of the insert 24 includes longitudinally spaced, annular protrusions 25 that project radially from the insert 24. These protrusions 25 would help retain the insert 24 as axial load is applied by the fastener. The protrusions 25 may be hexagonal in shape, or otherwise shaped and/or configured to cooperate with the ball 12, stem 14, neck 16 and/or foot 18 to prevent rotation of the insert 24 in relation to the ball 12, stem 14, neck 16 and/or foot 18.

Alternatively, the foot 18 may be provided with a lower pocket 26 into which a nut may be inserted or molded. A threaded fastener (e.g., a tee-bolt, carriage bolt or the like) supported in relation to the supporting surface (e.g., supported directly by the supporting surface or via a track, which, in turn, is supported by the supporting surface) may pass upwardly through the insert 24 (e.g., in a non-threaded fashion) and thread into the nut to allow for mechanical attachment of the ball mount 10 in relation to a supporting surface. Conversely, a threaded fastener may be inserted downwardly into the ball mount 10 (e.g., in a non-threaded fashion) and threaded into a nut in the lower pocket 26 until a head of the fastener bottoms out against a floor in an upper pocket 28, in which case a threaded portion of the threaded fastener may extend beyond the foot 18 of the ball mount 10 so as to be threadable into a mating thread in the supporting surface (e.g., directly in the supporting surface or support in relation to a track, which, in turn, is supported in relation to the supporting surface). In either case, pocket walls in the lower pocket 26 are configured to prevent rotation of the nut in relation to the ball mount 10.

As yet another alternative, the upper pocket 28 may be provided for receiving a nut, which may be inserted or molded therein, and a threaded fastener may pass through the ball mount 10 (e.g., in a non-threaded fashion) from below from the supporting surface (e.g., directly from the supporting surface or via a track, which, in turn, is supported in relation to the supporting surface) and may be threaded into the nut to allow for mechanical attachment of the ball mount 10 in relation to the supporting surface. In this case, a threaded shaft of the threaded fastener may enter through the bottom of the ball mount 10 and the ball mount 10 may be rotated downward in relation to the threaded shaft or a threaded shaft may be threaded up into the ball mount 10 to mount the ball mount 10 in relation to the supporting surface below the foot 18. The pocket walls in the upper pocket 28 are configured to prevent rotation of the nut in relation to the ball mount 10.

It should further be appreciated that a threaded fastener may be inserted downwardly into and through the ball mount 10 (e.g., in a non-threaded fashion), and the threaded fastener may be provided with a head (e.g., a head that is square, hexagonal or the like) that would cooperate and seat with a floor in the upper pocket 28 in the ball 12. The threaded fastener, in this instance, may threadably engage a mating thread in the supporting surface (e.g., directly in the supporting surface or via a track, which, in turn, is supported in relation to the supporting surface). It should be understood that pocket walls may prevent the nut, and thus, the threaded fastener from rotating in relation to the ball mount 10.

Figure 6:
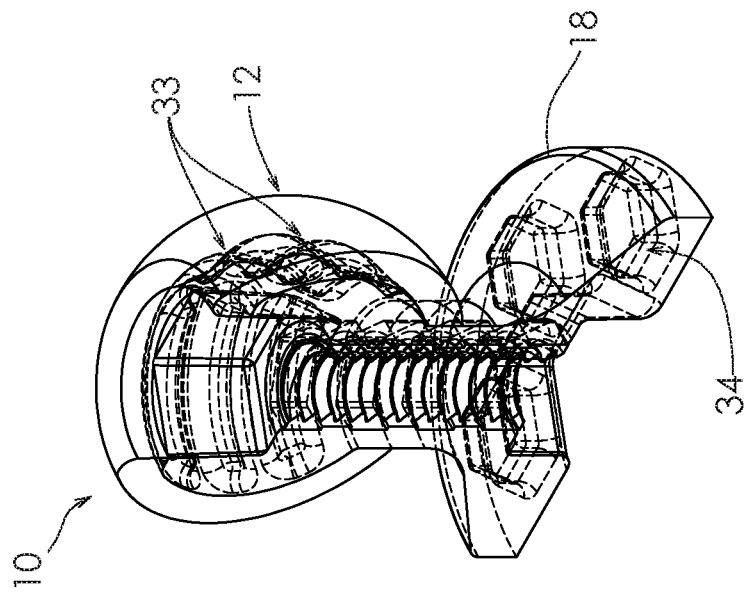
FIG. 6 is a perspective view of the ball mount showing an array of pockets in a foot thereof.

The ball mount 10, or portions thereof, may be formed of an inner plastic material 30, such as a plastic resin or thermoplastic, or other suitable polymer or material, and an outer elastomer 32, such as an elastomeric over-mold, that is compressible by a clamp, upon fixing the clamp with relation to the ball 12. Castellations 33 may be provided in the inner plastic material (shown in FIG. 6) to add surface area and prevent the outer elastomer 32 from rotating relative to the inner plastic material 30. It should be appreciated that the insert 24 may be molder over. Further, it should be appreciated that the structure of the ball mount 10 around the outside or perimeter of the insert 24 interlocks with the plastic material, preventing axial elongation and therefore increasing the axial force needed to stretch the insert 24 to a breaking point.

It should also be appreciated that a bottom or bottom surface of the foot 18 may be provided with an array of pockets 34 (e.g., annularly arranged or spaced around the foot 18). These pockets 34 may be arranged and configured to cooperate with corresponding mating protrusions on a supporting surface. The protrusions may key into the pockets 34, as the ball mount 10 tightens downwardly in relation to the supporting surface. The ball mount 10 may be rotated by hand to loosen or tighten the ball mount 10 with respect to the supporting surface. With the protrusions, once the ball mount 10 is sufficiently tightened, the ball mount 10 cannot inadvertently rotate relative to the supporting surface, and therefore, cannot be inadvertently loosened. This arrangement may be used, for example, to lock, fix or otherwise secure the ball mount 10 to the end of a post or extension, for example, by attaching the ball mount 10 to a post cap and then installing or fixing the post cap to an end of the post.

A plastic ball mount 10 according to the invention with a rigid reinforcement insert traversing a mostly spherical region into a neck 16 region of the ball mount 10 is superior in break resistance, resulting in a superior ball mount 10.

Figure 7:
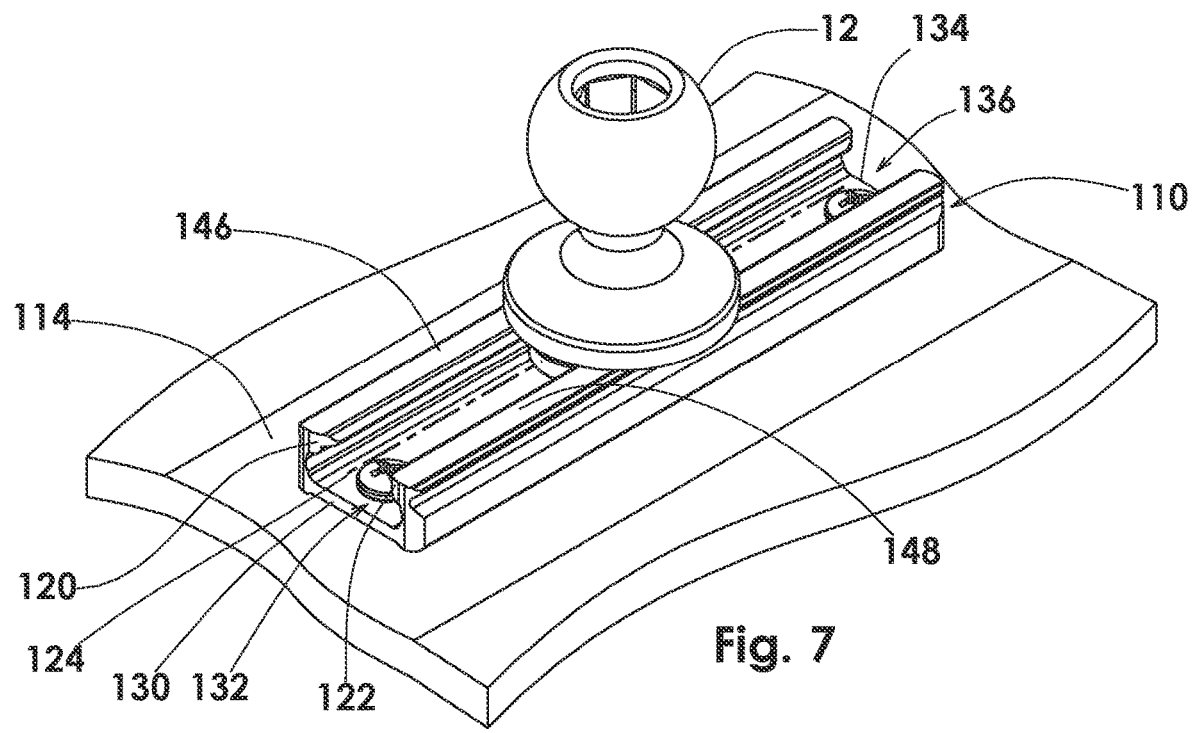
FIG. 7 is a perspective view of an accessory mounting track attached to an environmental surface with a ball mount attached to the accessory mounting track.

As illustrated in FIG. 7, the ball mount 10 may be supported in relation to an accessory mounting track 110. Examples of accessory mounting tracks are shown and described in U.S. Pat. No. 9,671,060 issued on Jun. 6, 2017, U.S. Pat. No. 9,828,073 issued on Nov. 28, 2017, and U.S. Pat. No. 10,563,813 issued on Feb. 18, 2020, the disclosures of which are hereby incorporated herein by reference in their entirety. Of course, the ball mount 10 may be supported in relation to other suitable mounting systems, such as shown and described in U.S. Pat. No. 9,863,576 issued on Jun. 9, 2018, the disclosure of which is hereby incorporated herein by reference in its entirety.

Figure 8:
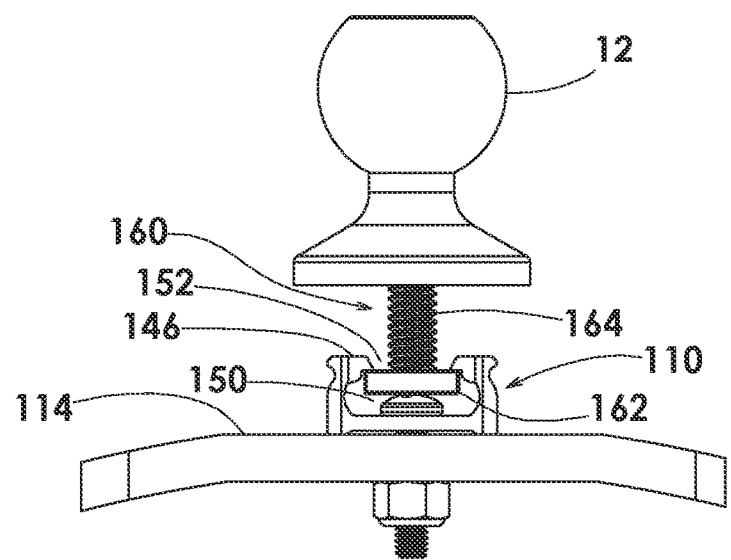
FIG. 8 is an end view of the accessory mounting track and ball mount shown in FIG. 7.

The illustrated mounting track 110 may be comprised of a left support flange 120, a right support flange 122, and a central axis 124, which may be substantially parallel to a slot channel 150 (shown in FIG. 8). The accessory mounting track 110 may also comprise a proximal end 130 and a distal end 134 with a proximal slot entry point 132 and a distal slot entry point 136.

It may be mentioned at this point that, for the scope of this entire disclosure, orientation terms, such as "proximal" and "distal" or "left" and "right", refer to their subject matter as semantic conveniences only and not as a necessary condition of the accessory mounting track 110, as the accessory mounting track 110 may obviously be utilized in any desired position or orientation.

The accessory mounting track 110 may also comprise attachment holes 140 (shown in FIG. 9), which may be disposed linearly or otherwise within the slot channel 150 and parallel or substantially parallel to the central axis 124 within the slot channel 150. It should be understood that attachment holes may be provided along mounting flanges at or near outermost edges (e.g., along left and right sides) of the accessory mounting track 110. The attachment holes may have a countersink feature or a counterbore feature so that fasteners may be recessed therein.

Referring now to FIG. 8, the accessory mounting track 110 may have a concave recess, which may terminate at left and right interface flats on the bottom of the left and right sides of the accessory mounting track 110. The interface flats may firmly contact a supporting surface 114 upon securing the accessory mounting track 110 to the supporting surface 114. Because of the spacing between the flats, high lateral stability may be achieved. The concave recess may minimize interference of a curved or irregular shape of the supporting surface 114 between the flats.

The accessory mounting track 110 may comprise, in addition to the slot channel 150, a slot opening 152, which may be bounded on each side by a containment ledge, defined by an underside of the flanges 120, 122 along the slot opening 152.

Continuing with reference to FIG. 8, the ball mount 10 is shown attached to the accessory mounting track 110 via a tee-bolt 160. An example of a tee-bolt is shown and described in U.S. Pat. No. 9,863,576 issued on Jun. 9, 2018, the disclosure of which is hereby incorporated herein by reference in its entirety. The tee-bolt 160 may be comprised of a head 162 and a stud 164, which may be threaded into the ball mount 10. The tee-bolt 160 may be inserted into the slot channel 150 through a slot entry point 132, 136 (shown in FIG. 8), or the slot opening 152, as shown and described in U.S. Pat. No. 9,828,073 issued on Nov. 28, 2017, and/or U.S. Pat. No. 10,967,939 issued on Apr. 6, 2021, and/or in a manner as described in U.S. Pat. No. 9,879,819 issued on Jan. 30, 2018. The tee-bolt 160 is inserted in the slot channel 150, oriented so that the stud 164 is in or extends through the slot opening 152. In the state shown in FIG. 8, the ball mount 10 may be positioned along the central axis 124 (shown in FIG. 7), with the slot channel 150 containing the tee-bolt 160 therein, but not preventing movement of the ball mount 10 along the central axis 124.

Figure 9:
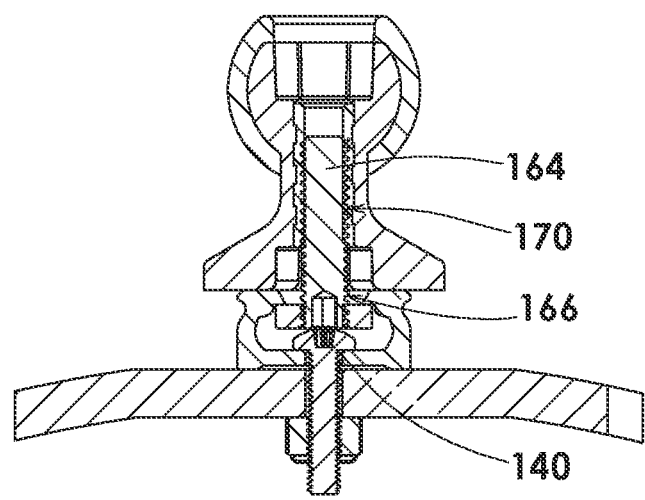
FIG. 9 is a sectional view of the accessory mounting track and ball mount shown in FIG. 7.

In FIG. 9, the ball mount 10 is shown fully installed on the accessory mounting track 110. The ball mount 10 has female threads 170, which are threaded onto the stud 164 of the tee-bolt 160.

It should be appreciated that by rotating the ball mount 10, threads 166 of the stud 164 interact with the female threads 170, which may urge the ball mount 10 toward or away from the head 162 of the tee-bolt 160, depending on the direction of rotation. When appropriately rotated, the ball mount 10 is urged toward the head 162 of the tee-bolt 160 until the mounting surface of the ball mount 10 (an underside of the ball mount 10) makes contact with upper surfaces 146, 148 (shown in FIG. 7) of the accessory mounting track 110 and an upper surface of the head 162 makes contact with the containment ledge along the sides of the slot opening 152. When the ball mount 10 is turned farther, friction is increased between these surfaces, which effectively locks the ball mount 10 into position. By rotating the ball mount 10 in the opposite direction, the friction is reduced or eliminated and the ball mount 10 may once again be positioned along the central axis 124, or removed from the track 110 through the slot opening 152 or by sliding it out of either end of the accessory mounting track 110.

The accessory mounting track 110 may comprise an extruded profile with attachment holes 140. The length of the track 110 may vary as may the number of attachment holes 140. The attachment holes 140 may be disposed linearly near the outer edges of the track 110 or linearly, approximately centered and along or parallel to the longest axis of the track 110 (see FIG. 7). The attachment holes 140 may be of counter bore or countersink type, or may be simple through holes. The recess may be concave, angular, or another shape, allowing clearance for attaching to rounded or irregular surfaces and maximizing stability by enabling the supporting environment to make contact with the track 110 along the edges. The region near the outer edges of the underside of the track 110 may be flat and approximately aligned with the rows of attachment holes 140 to maximize lateral stability.

The track 110 composition may be of a lightweight material, such as aluminum or plastic, or a composite comprising two or more such materials. The surface of the track 110 may be treated for harsh environmental exposure, such as UV radiation and saltwater. The upper surfaces 146, 148 of the track 110 may be textured with any suitable texture to improve the gripping characteristics of that surface, which may increase resistance to accessories mounted to that surface from slipping either by rotation or linearly along the axis of the track 110. This texture may be the result of geometry in the track shape, such as ridges or grooves in the surface. Alternatively or in addition to this geometry, the texture may be the result of etching, application of a plastic or rubberized coating, or other surface treatments.

Attachment of the track 110 to the support surface 114 may be achieved by putting screws or other suitable fasteners through one or more of the attachment holes 140 and into the surface 114 on which the track 110 is to be mounted. In some configurations, the track 110 may be attached to an adapter bracket, such as a rail clamp, for attachment to the environment, or molded or integrated into the support surface 114.

The track profile may contain an internal C-shaped slot or other suitable shape to receive a tee-bolt 160, sliding nut, or other connecting feature internally with which to attach accessory devices.

The tee-bolt 160 may be attached to the ball mount 10 by screwing the threaded stud 164 of the tee-bolt 160 into the ball mount 10, leaving the head 162 of the tee-bolt 160 extended some distance from the ball mount 10.

Attachment of the ball mount 10 to the track 110 may be achieved by inserting the head 162 of the tee-bolt 160 into a slot opening 152. The C-shape of the slot 150 may captivate the head 162 of the tee-bolt 160, allowing movement only along the long axis of the track 110. Once positioned, the ball mount 10 may be immovably tightened to the track 110 by rotating the ball mount 10. The interaction between the threads in the ball mount 10 and those on the stud 164 urges the head 162 of the tee-bolt 160 toward the ball mount 10, thus causing the head 162 of the tee-bolt 160 to make contact with the inside of the slot channel 150 and causing the ball mount 10 to make contact with the upper surfaces 146, 148 of the track 110 opposite the slot channel 150. Farther rotation of the ball mount 10 creates pressure on these areas of contact, the resulting friction of which, with reasonable tightening force, is adequate to inhibit rotation of the ball mount 10 in either the tightening or the loosening direction or from slipping linearly along the track 110. It should be appreciated that texture may be provided on the mounting surface 114 of the track 110 to increase this friction.

It should be understood that although a tee-bolt 160 is depicted in these drawings for attaching the ball mount 10 to the track 110, other attachment configurations for attaching and removing the ball mount 10 to and from the accessory mounting track 110 may be employed. For example, in an alternate configuration, a slot nut and stud configuration (not shown) may be used instead of the tee-bolt 160. In this configuration, the slot nut may be inserted into the slot channel 150 instead of the head 162 of the tee-bolt 160. The slot nut may not be permanently attached to the stud 164 as it is in the tee-bolt configuration, but instead may have female threads which interact with a stud, resulting in a tightening effect that is similar to that of the tee-bolt configuration.

In applications in which excessive rotational forces may be applied to the ball mount 10, an external locking mechanism (not shown) may be used to prevent the ball mount 10 from rotating in the loosening direction. Also, mechanical features (e.g., grooves, serration, or teeth) may be incorporated into some surface on or surfaces on the track 110 that may cooperate with corresponding features on the ball mount 10, or that encourage increased friction between the track 110 and the ball mount 10.

On the sides of the track 110 there may be grooves in a dovetail, radial, or other shape (not shown), which may allow attachment of devices by externally clamping the track 110, in cooperation with or independent of the C-shaped slot channel 150 described above. In this application, the ball mount 10 may have features that cooperate with the grooves so that when it is tightened, the features in the ball mount 10 will mechanically interlock with the grooves.

The ends of the track 110 may be contoured to remove edges that may cause injury or snags or may be angled in such a way that interference of gear, persons or other external items is minimized.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

- 10 ball mount
- 12 ball
- 14 stem
- 16 neck
- 18 foot
- 20 base
- 22 hole
- 24 insert
- 25 protrusions
- 26 lower pocket
- 28 upper pocket
- 30 inner plastic material
- 32 outer elastomer
- 33 castellations
- 34 pockets
- 110 accessory mounting track
- 114 mounting surface
- 120 left support flange
- 122 right support flange
- 124 central axis
- 130 proximal end
- 132 proximal slot entry point
- 134 distal end
- 136 distal slot entry point
- 140 attachment holes
- 146 upper surface
- 148 upper surface
- 150 slot channel
- 152 slot opening
- 160 tee-bolt
- 162 head
- 164 stud
- 166 threads
- 168 head upper surface
- 170 female threads

What is claimed is:

1. A ball mount for use in a ball and socket joint, the ball mount comprising:
   a first portion comprising a ball configured to cooperate with a socket to form a ball and socket joint,
   a second portion comprising a stem supported in relation to the ball, the stem being configured to support the ball in relation to a supporting surface, and
   a rigid insert supported in relation to the ball and the stem, the insert being structured to reinforce the ball mount between the ball and the stem;
   wherein the insert extends through a region of the ball mount traversing an intersection of the ball and the neck to reinforce and strengthen an area at the intersection;
   wherein the insert is provided with longitudinally spaced, annular protrusions projecting radially outwardly that retain the insert in the ball mount.

2. The ball mount of claim 1, wherein the ball is spherical or generally spherical.

3. The ball mount of claim 1, wherein the stem is cylindrical or generally cylindrical.

4. The ball mount of claim 1, wherein the stem extends generally in a radial direction from the ball.

5. The ball mount of claim 1, wherein the stem intersects the ball at a neck, which is defined as an area of the ball mount that is of highest stress concentration.

6. The ball mount of claim 1, wherein the stem transitions from a neck, proximate the ball, to a foot, distal from the ball, wherein the foot at least in part provides a mounting base for the ball mount, which provides stability to the ball mount in relation to the supporting surface.

7. The ball mount of claim 6, wherein the foot provides a solid foundation for the ball mount.

8. The ball mount of claim 6, wherein the mounting base is formed by the foot, together with a lower portion of the stem.

9. The ball mount of claim 1, wherein the insert enters into the ball and passes through the stem.

10. The ball mount of claim 1, wherein the ball is plastic and the insert is metal and the ball is formed around the insert.

11. The ball mount of claim 1, wherein the insert is threaded to cooperate with mounting hardware in the form of a threaded fastener to allow for mechanical attachment of the ball mount in relation to the supporting surface.

12. The ball mount of claim 11, wherein the mounting hardware is a tee-bolt that cooperates with a slotted track for mounting the ball mount for adjustment in various positions in relationship to a track, which in turn is mountable in relation to the supporting surface.

13. The ball mount of claim 12, wherein the supporting surface is a surface of a vehicle or vessel.

14. The ball mount of claim 1, wherein the protrusions are longitudinally spaced in a lengthwise direction along the insert, and wherein the protrusions are annular protrusions that project radially in relation to the insert to cooperate with the ball to aid in retaining the insert in the ball as axial and angular load is applied by mounting hardware.

15. The ball mount of claim 14, wherein the protrusions are hexagonal in shape to prevent rotation of the insert in relation to the ball.

16. The ball mount of claim 1, further comprising a hexagonal shaped pocket into which a nut is insertable, the nut being threadably engageable with a threaded fastener, which is configured to enter into at least a portion of the insert, which is non-threaded, and support the ball mount in relation to a supporting surface.

17. The ball mount of claim 1, further comprising a pocket into which a head of a threaded fastener is insertable, the threaded fastener being configured to enter into at least a portion of the insert, which is non-threaded, and support the ball mount in relation to a supporting surface.

18. The ball mount of claim 1, further comprising at least one pocket in a bottom of the ball mount, the pocket being arranged and configured to cooperate with a corresponding mating protrusion on the supporting surface.

19. A ball mount for use in a ball and socket joint, the ball mount comprising:
   a ball configured to cooperate with a socket of a ball and socket joint,
   a stem that is supported in relation to the ball, the stem configured to support the ball in relation to a supporting surface, the stem transitions from a neck, proximate to the ball, to a foot, distal from the ball, and
   a rigid insert crossing a transition area extending through a region of the ball mount traversing an intersection of the neck and the stem to strengthen the ball mount and mitigate failure at the transition area when stress is applied to the ball when the foot is fixed in relation to the applied stress;
   wherein the insert is provided with longitudinally spaced, annular protrusions projecting radially outwardly that retain the insert in the ball mount.

20. The ball mount of claim 19, wherein the insert is threaded to cooperate with a threaded stud of mounting hardware.

21. The ball mount of claim 20, wherein the mounting hardware is a tee-bolt.

22. The ball mount of claim 19, wherein an outward facing surface of the insert has features to engage at least one of the ball, neck, stem and foot, creating a secure bond between the insert and the at least one of the ball, neck, stem and foot such that the normal force applied during tightening the insert on mounting hardware does not easily dislodge the insert relative to the at least one of the ball, neck, stem and foot, and angular force does not cause the insert to rotate relative to the at least one of the ball, neck, stem and foot.

23. The ball mount of claim 22, wherein the features are protrusions that are longitudinally spaced in a lengthwise direction along the insert, and wherein the protrusions are annular protrusions that project radially in relation to the insert to cooperate with at least one of the ball, neck, stem and foot to aid in retaining the insert therein as the normal force is applied by the mounting hardware.

24. The ball mount of claim 23, wherein the protrusions are hexagonal in shape to prevent rotation of the insert in relation to the ball.

25. The ball mount of claim 19, wherein the insert is not threaded and would not experience forces related to the tightening of threaded interfaces.

* * * * *